United States Patent
Grimaud et al.

(10) Patent No.: US 7,913,190 B2
(45) Date of Patent: Mar. 22, 2011

(54) METHOD, SYSTEM AND SOFTWARE FOR VISUALIZING 3D MODELS

(75) Inventors: Jean-Jacques Grimaud, Harrisville, NH (US); Eric Piccuezzu, Nice (FR); James Dugalais, Antibes (FR)

(73) Assignee: Dassault Systèmes, Suresnes (FR)

( * ) Notice: Subject to any disclaimer, the term of this patent is extended or adjusted under 35 U.S.C. 154(b) by 445 days.

(21) Appl. No.: 11/183,236

(22) Filed: Jul. 18, 2005

(65) Prior Publication Data

US 2007/0013690 A1    Jan. 18, 2007

(51) Int. Cl.
G06F 3/048    (2006.01)
G06F 15/00    (2006.01)
G06F 17/00    (2006.01)
G06F 19/00    (2006.01)
G06F 17/50    (2006.01)

(52) U.S. Cl. .......... 715/848; 715/700; 345/419; 700/97; 700/98

(58) Field of Classification Search .......... 715/700, 715/848; 345/419; 700/97, 98
See application file for complete search history.

(56) References Cited

U.S. PATENT DOCUMENTS

| | | | |
|---|---|---|---|
| 4,868,766 A | 9/1989 | Oosterholt | |
| 5,289,567 A | 2/1994 | Roth | |
| 5,808,616 A | 9/1998 | Shimizu | |
| 5,815,154 A | 9/1998 | Hirschtick et al. | |
| 5,819,062 A * | 10/1998 | Srikantappa | 345/440 |
| 6,219,049 B1 | 4/2001 | Zuffante et al. | |
| 6,396,522 B1 | 5/2002 | Vu | |
| 6,559,860 B1 * | 5/2003 | Hamilton et al. | 715/700 |
| 6,636,211 B2 | 10/2003 | Chartier et al. | |
| 6,654,027 B1 | 11/2003 | Hernandez | |
| 6,714,201 B1 * | 3/2004 | Grinstein et al. | 345/474 |
| 6,836,270 B2 | 12/2004 | Du | |
| 6,859,201 B1 | 2/2005 | Singh | |
| 6,885,367 B1 | 4/2005 | Fujieda | |
| 6,944,515 B2 * | 9/2005 | Nakajima et al. | 700/105 |
| 7,620,525 B2 * | 11/2009 | Denny et al. | 700/97 |
| 2001/0055013 A1 | 12/2001 | Fuki | |
| 2003/0174140 A1 | 9/2003 | Shima | |

OTHER PUBLICATIONS

Shen, Zhigang, Flexible Domain Viewer for Supporting Multi-trade Views of 3D CAD Data, 2007, Proquest Dissertations and Theses, vol. 0729, Iss. 0070.*

* cited by examiner

*Primary Examiner* — William L Bashore
*Assistant Examiner* — Jordany Núñez
(74) *Attorney, Agent, or Firm* — Stites & Harbison PLLC; Jeffrey A. Haeberlin

(57) ABSTRACT

A combined viewer-spreadsheet application provides display of (i) a spreadsheet including a tree window for an extendable tree structure of an object and (ii) a three dimensional (3D) model of the object. A user of the application is able to add one or more columns or arrays to the tree structure and to reflect in the 3D model the values of elements of the columns or arrays added. The tree structure includes at least one assembly, a plurality of subassemblies forming the assembly, and a plurality of parts for each of the subassemblies.

13 Claims, 4 Drawing Sheets

METHOD, SYSTEM AND SOFTWARE FOR VISUALIZING 3D MODELS

FIELD OF THE INVENTION

The present invention relates generally to the field of computer aided design (CAD) and to the presentation of models for viewing and visualization.

BACKGROUND OF THE INVENTION

CAD systems are used by engineers and others in conceiving and designing parts and assemblies of parts. The output of a CAD system is a native file which incorporates many elements of the design, e.g., the design geometry, the purpose of or interest in the design, the functions to be performed, the materials to be used, etc. CAD files may be shared between CAD systems but the size of the files, and in particular, the size of design geometry section of the files, makes the use thereof cumbersome.

In an attempt to address this problem, a number of systems have been developed for creating "light-weight," reduced content files. These systems employ different techniques including approximations of the model surfaces, tessellation, classes of surface equations and the like.

A viewer is an application which visualizes the CAD file of a particular assembly of parts and creates, on a display screen, a solid, i.e., three dimensional (3D), model representation or image of the assembly and the parts thereof. Viewer applications can be used for digital model mock-ups (for interference checking, clearance checking, mechanism automation and the like) or in visualization (e.g., in viewing and mark-up. collaboration) or in publishing (of, e.g., a maintenance manual, assembly manual, or the like).

Moreover, if one wishes to change the highlighting of a part (or, similarly, the visibility of a part from visible to invisible), although there are a number of methods for doing this, the process is a multi-step, piecemeal process. For example, for making a part invisible, currently available methods include: (1) clicking on the image of the part to select the part and then clicking on an icon to make the part disappear; (ii) clicking on an icon to switch to an "invisible" mode and clicking on the part that is to be made invisible; and (iii) clicking on the tree structure for the assembly, selecting a part and then changing the visibility attribute of the part. Moreover, the multi-step process must be repeated for each part that is to be made invisible.

The problems discussed above have been made more difficult by a very new development in art, i.e., the ability to display, in real time (e.g., at a frame rate of 30 frames per second), on a standard computer, a 3D model containing thousands of parts, or even tens of thousands of parts. In this regard, before this development, standard computers were only able to display a smaller number of parts in real time or were only able to display such a large number of parts (i.e., on the order of thousands of parts) at frame rates so low so as to not allow any interaction by the user. The methods referenced above have become at best impractical.

A viewer, i.e., a software application that enables visualization of a 3D model, typically provides two or three windows as follows: (i) a 3D model window depicting the overall solid or 3D model; (ii) a tree structure window depicting the tree structure of the parts of the model as a list; and (iii) in some viewers, a window depicting the properties or attributes of the part or parts currently being selected. Such viewers typically include functions such as a highlighting function wherein clicking on a part from the list in the tree structure window will result in highlighting of a corresponding part in the 3D model window and wherein, conversely, clicking on a part in the 3D model window will result in highlighting of the name of the part in the tree structure window.

As the number of parts displayed increases, the user has to separate the core of the problem that he is trying to solve from its context. In a model of 10,000 parts, the user may be directly interested only in a few hundred of these parts, but may want to understand the location of the parts and how they fit with their environment (the context).

SUMMARY OF THE INVENTION

Very generally speaking, the present invention concerns a viewer application or viewer which essentially combines a spreadsheet and a viewer in an interactive manner and, in preferred embodiments, in a manner wherein there is an automatic link between the (i) representation of the outputs of the spreadsheet in a results analysis and (ii) a 3D model depicted by the viewer. In preferred embodiments, mapping between the two is employed.

Of course, spreadsheet software and viewer software are both well known, commercially available products. Further, it should be understood that, as explained in more detail below, the present invention is not a simple juxtaposition of a viewer and a spreadsheet, e.g., a viewer that simply provides a simultaneous display of both spreadsheet and a 3D model.

It should also be understood that the method and system of the invention is particularly adapted for use by end-users, rather than programmers, and, in this regard, does not require a programming environment, a graph set or compilation. In a preferred embodiment, the method and system of the invention modify the display of a 3D object and, e.g., the sounds linked to the 3D object, according to formulas and behaviors defined by the user and based on properties that can be dynamically updated.

According to one aspect of the invention, there is provided a computer readable medium having computer executable instructions stored therein for execution on a computer, the computer executable instructions comprising the steps of:

providing a display of both a three dimensional (3D) model and a spreadsheet including elements relating to the 3D model;

augmenting the spreadsheet in response to user input so as to produce an augmented spreadsheet linked to the 3D model; and reflecting in the 3D model the value of at least one element of the augmented spreadsheet.

Preferably, the reflecting step comprises associating, in real time, a part of the 3D model with an immediate attribute selected from the group consisting of graphic appearance, visibility, color shade, sound and speech.

Preferably, the spreadsheet includes a tree structure which comprises at least one assembly, a plurality of subassemblies forming said at least one assembly and a plurality of parts for each of said plurality of subassemblies, and the step of augmenting the spreadsheet includes adding at least one column or array to the tree structure. Advantageously, the augmenting step further comprises defining a name and variable type for the at least one column added to the tree structure. The augmenting step preferably further comprises using a formula to compute values for the elements of the at least one added column. Alternatively, or in addition, the augmenting step further comprises providing inputting of the values of the elements of the at least one added column. Further, the augmenting step preferably includes associating the value of the elements of the at least one column with each part of the at least one subassembly. Advantageously, the augmenting step further comprises selecting an interaction method for providing interaction between values of the elements and the parts of the at least one subassembly.

In accordance with another aspect of the invention, there is provided a viewer application providing display of a tree structure of an object and a three dimensional (3D) model of the object wherein a user of the application is able to add at least one column or array to the tree structure and to reflect in the 3D model the value of at least one element of the at least one column or array added.

According to yet another aspect of the invention, there is provided a viewer system comprising:

a computer including a display screen and a user input; and a computer readable medium having computer executable instructions stored thereon for execution by the computer, the instructions comprising the steps of:

providing a display on said display screen of both a three dimensional (3D) model and a spreadsheet including elements relating to the 3D model;

augmenting the spreadsheet in response to an entry at the user input so as to produce an augmented spreadsheet linked to the 3D model; and reflecting in the 3D model the value of at least one element of the augmented spreadsheet.

Preferably, the reflecting step comprises associating, in real time, a part of the 3D model with an immediate attribute selected from the group consisting of graphic appearance, visibility, color shade, sound and speech.

Preferably, the spreadsheet includes a tree structure which comprises at least one assembly, a plurality of subassemblies forming said at least one assembly and a plurality of parts for each of said plurality of subassemblies, and the step of augmenting the spreadsheet includes adding at least one column or array to the tree structure. Advantageously, the augmenting step further comprises defining a name and variable type for the at least one column added to the tree structure. The augmenting step further comprises using a formula to compute values for the elements of the at least one added column. Alternatively, or in addition, the augmenting step further comprises providing for inputting of the values of the elements of the at least one added column. Preferably, the augmenting step includes associating the value of the elements of the at least one column with each part of the at least one subassembly and selecting an interaction method for providing interaction between values of the elements and the parts of the at least one subassembly.

In accordance with yet another aspect of the invention, there is provided a method for visualizing a three dimensional (3D) model, said method comprising the steps of:

providing a display of both a three dimensional (3D) model and a spreadsheet including elements relating to the 3D mode;

augmenting the spreadsheet in response to external input so as to produce an augmented spreadsheet linked to the 3D model; and reflecting in the 3D model the value of at least one element of the augmented spreadsheet.

The reflecting step preferably comprises associating, in real time, a part of the 3D model with an immediate attribute selected from the group consisting of graphic appearance, visibility, color shade, sound and speech.

Preferably, the spreadsheet includes a tree structure which comprises at least one assembly, a plurality of subassemblies forming said at least one assembly and a plurality of parts for each of said plurality of subassemblies, and the step of augmenting the spreadsheet includes adding at least one column or array to the tree structure, and defining a name and variable type for the at least one column added to the tree structure.

Preferably, the augmenting step further comprises using a formula to compute values for the elements of the at least one added column or inputting the values of the elements of the at least one added column, associating the value of the elements of the at least one column with each part of the at least one subassembly and selecting an interaction method for providing interaction between values of the elements and the parts of the at least one subassembly.

Further features and advantages of the present invention will be set forth in, or apparent from, the detailed description of preferred embodiments thereof which follows.

DESCRIPTION OF THE PREFERRED EMBODIMENTS

Figure 1A:
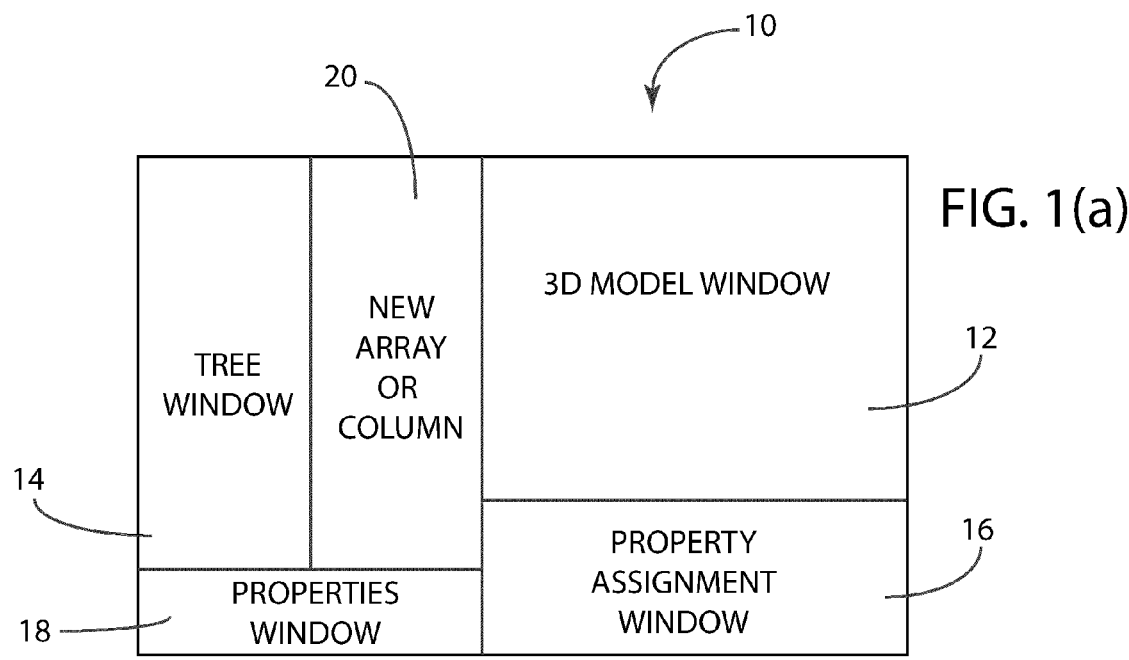
FIGS. 1(a) to 1f) are schematic representations of the display ("screen shot") provided by the method and system of the invention in one preferred embodiment thereof.

Before considering some specific preferred embodiments of the invention, certain definitions are believed to be in order. Although the terminology used herein is believed to be consistent with the terminology conventionally used in this art, the conventional terminology is not always consistent and the definitions below are provided to the extent that the usage here may be different from conventional terminology.

Object: An object is a product assembly, subassembly, or part. An object can have one or many properties.

Property (or attribute): A property is the association between a unique identifier and a value. A property may be defined or not defined for an object.

Variable: A variable is either defined by a user, or by the system, or is the value of a given property for an object, or is the result of a formula applied to an object.

System variable: A system variable is a variable for which the value is defined by the system. For example, the variable "today" is defined by the system and has for value today's date.

User variable: A user variable is a variable value defined by a user, which can be different from existing properties.

Element: An element of a column or of an array is the value of a variable or of a property.

It is noted that with respect to variable types, the method and system of the invention enable the use of many types of variables, including integer, rational, real (single and double precision), character string, date, value amount, array and the like.

In addition the method and system allows new arrays of a variable type to be defined, i.e., enables the user to create a new column or array which has in general n×1 elements, where n is the number of parts, subassemblies, and assemblies included in the 3D model, as discussed below. In general, elements of a column or of an array are assigned the same variable type. The content of each element of the array can be entered manually by keyboard or some other user device, by input of pre-existing data, or computed as the algorithmic result of a formula.

Further, many types of operators and functions can be used such as arithmetic, logical, comparison, string operator, sort, query and lookup, standard function (trigonometric, mathematical, statistical) and the like.

In accordance with important embodiments, formulas can be created which apply operators and functions to defined variables or properties. A formula, in this context, is a function of a property or properties, or a function of a variable or variables, or a function of property(ies) and variable(s). In addition, the result of a formula may be assigned to a variable or a property. In these embodiments, the formula is entered by the user with a keyboard or some other means and is assigned to a column or an array of elements (for example, the three moments of inertia around the three principal axes). A formula bar is preferably employed which generally provides immediate feedback about the formula to the user. The formulas use variables already defined in the array such as, for example, "part name" or "part weight in kg."

Alternate inputs such as a mouse or a vocal command may be used directly on the 3D model representation to select objects individually or in groups. The selection is automatically reflected in the selection of the same object properties, and dependent or associated user formulas, such as totals, are automatically updated as well.

Referring to FIGS. 1(a) to 1(f), a series of "screen shots" are shown which depict, in a schematic presentation, the various displays provided on a display monitor screen or like display device during the operation of, i.e., in executing, the viewer application of the invention. It will be understood that the screen shots depicted simply represent one preferred embodiment and that other presentations with, e.g., different arrangements of the visual information, can also be provided.

Referring first to FIG. 1(a), display screen 10 is shown which includes a 3D model window 12, a tree window 14, a properties assignment window 16, a properties window 18, and a new array or column 20 which is to be added to the tree window 12 as explained below. The 3D model window 12 is preferably conventional and in common with the 3D model window of a standard viewer, shows the parts and the assembly of the 3D model. As is conventional, the user can manipulate the orientation or viewpoint of the 3D model with commands from a keyboard and/or a mouse and/or other command devices. The user can also operate on the 3D model by using, e.g., keyboard commands or clicking on icons inside toolbar windows or by using other methods.

In the embodiment under consideration here, the tree window 14 displays a list of, e.g., (i) subassemblies of the 3D model, (ii) the lower order subassemblies creating the basic subassemblies and (iii) the parts creating the lower order or lowest level subassemblies. The result is a tree structure and hence the name tree window. Tree windows are conventional and the tree window 14 is preferably a standard tree window such as that employed by most viewers.

The property assignment window 16 specifies the relationship between the elements of a column or array and the 3D model. In a preferred embodiment, at least two relationships are specified, viz., the content of the relationship and the method used. For example, regarding content, the brightness of a part as depicted in the 3D model can be assigned in accordance with the value of the element (e.g., a part in the 3D model will have a first brightness when an element for the part has a first value or falls within a predetermined range of values, and will have second brightness when an element for the part has a different value or falls within a different predetermined range of values). With respect to the method relationship, for example, a method can be provided wherein the assigned brightness for the parts will be immediately reflected in the 3D model for all parts or a method can be provided wherein the assigned brightness is reflected in the 3D model when a part in the 3D model is selected, e.g., using a cursor, so that the brightness of the other parts remains unchanged unless the parts are selected.

The properties window 18 contains or shows the values and/or states of all of the properties of the current element selected in a column.

The new array or column window 20 is provided to create a new column or array as described in more detail below. In general, as indicated above, the new column or array has n×1 elements wherein n is the number of parts and subassemblies included in the 3D model. As was also discussed above, generally speaking, elements of a column or array are assigned the same variable type. The content of each element of the column or array can be extended manually, e.g., by using a keyboard or other user controlled device or by input of pre-existing data (e.g., by transfer from another file) or computed algorithmically (i.e., computed from other data as the algorithmic results of formula, equation or the like). This means that there is not only a link between the 3D model and the spreadsheet (i.e., the spreadsheet of the tree window) but also synchronization between the 3D model and the spreadsheet for all properties and variables, whether initially defined or added by the user.

In FIG. 1(a), augmentation or extension of the tree window 14 is provided, as indicated by new array or column 20, by the addition of a new column of elements (or a new array of elements) to the tree window 14, and with the new column or array having the same elements as the tree window 14. Thus, the tree window 14 together with the new array or column 20 constitute a spreadsheet.

Figure 1B:
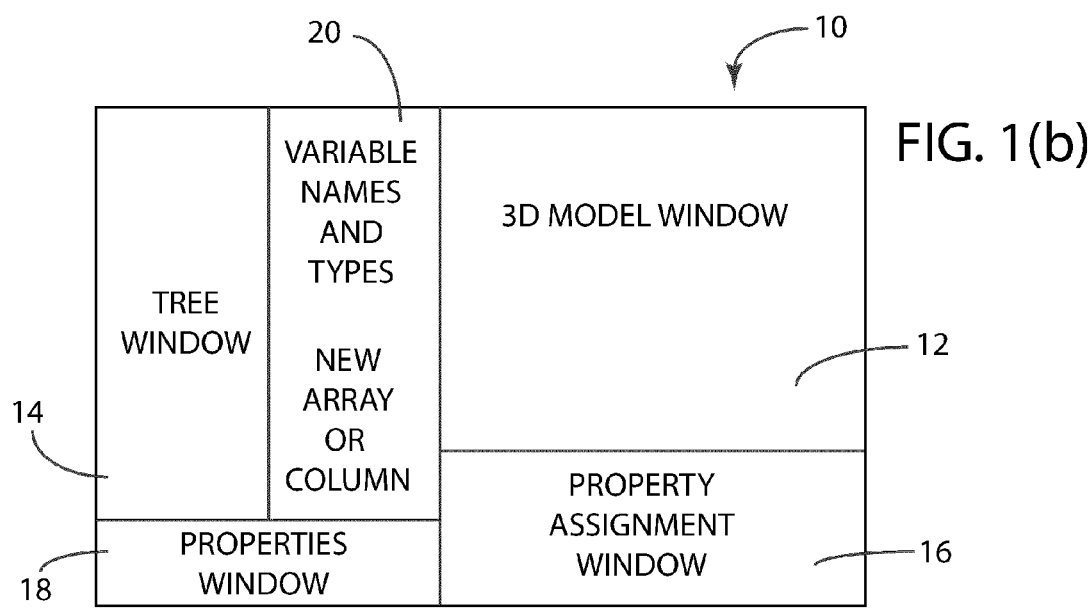

Referring to FIG. 1(b), as part of this augmentation or extension, a name and variable type are defined by selecting the first element of the column or array. Alternatively, rather than selecting the first element or the column or array, this step can be carried out in the property assignment window 16 wherein, on one side there is provided a scrollable list of variables (indicated at 24 in FIG. 1(e)) and on the other side, there is provided a list of the variable data types that are available in the viewer.

Figure 1C:
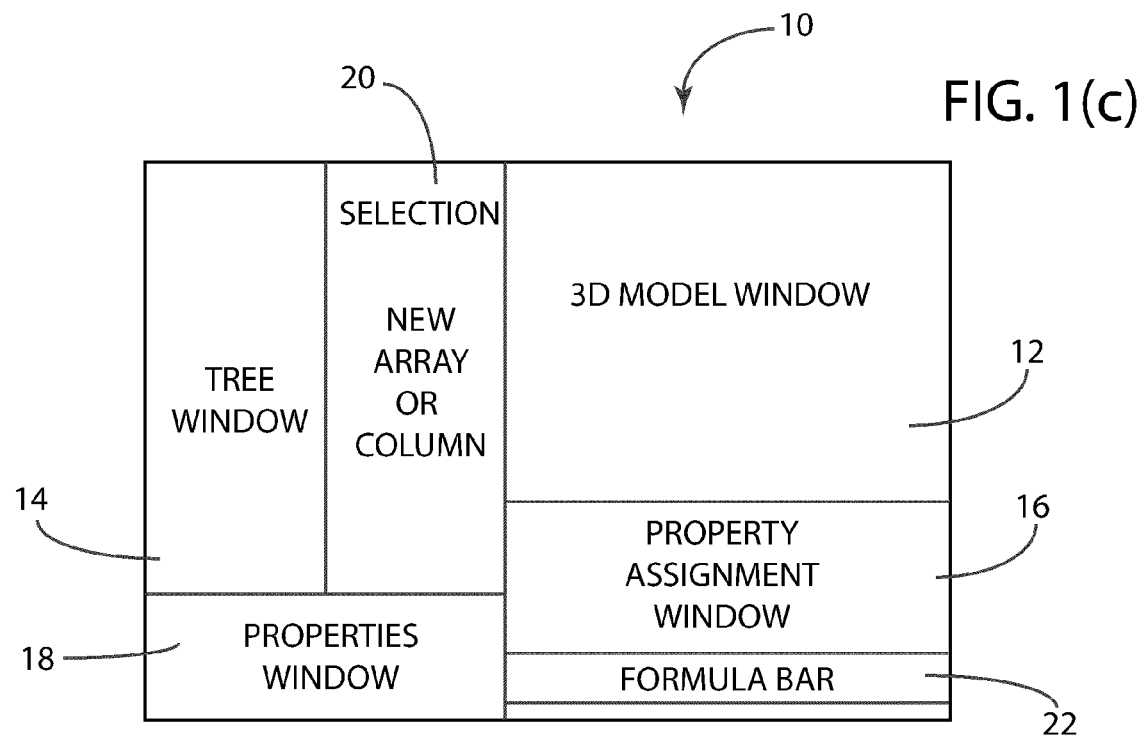

Referring to FIG. 1(c), once the first element of the column has been selected, a formula can be entered, e.g., by typing in the formula bar 22.

Figure 1D:
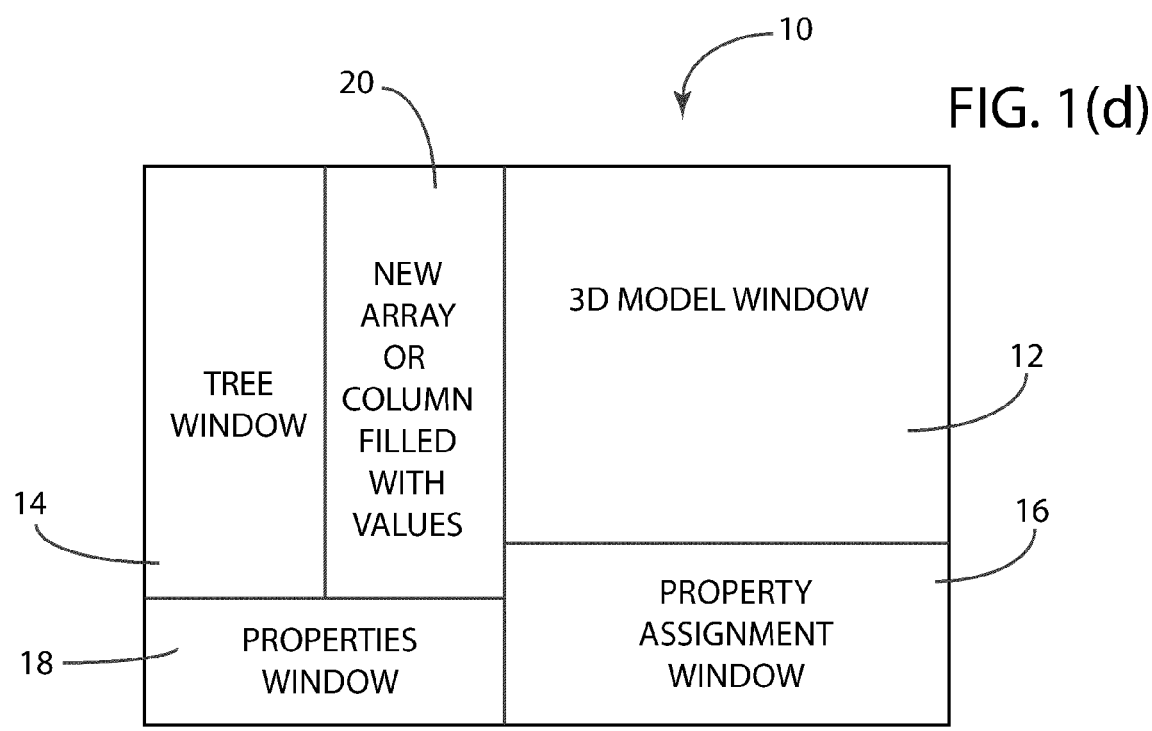

Next, as indicated in FIG. 1(d) by column or array 20, the values of the elements of the column or array are computed and these values are entered into or filled in the new array or column.

Figure 1E:
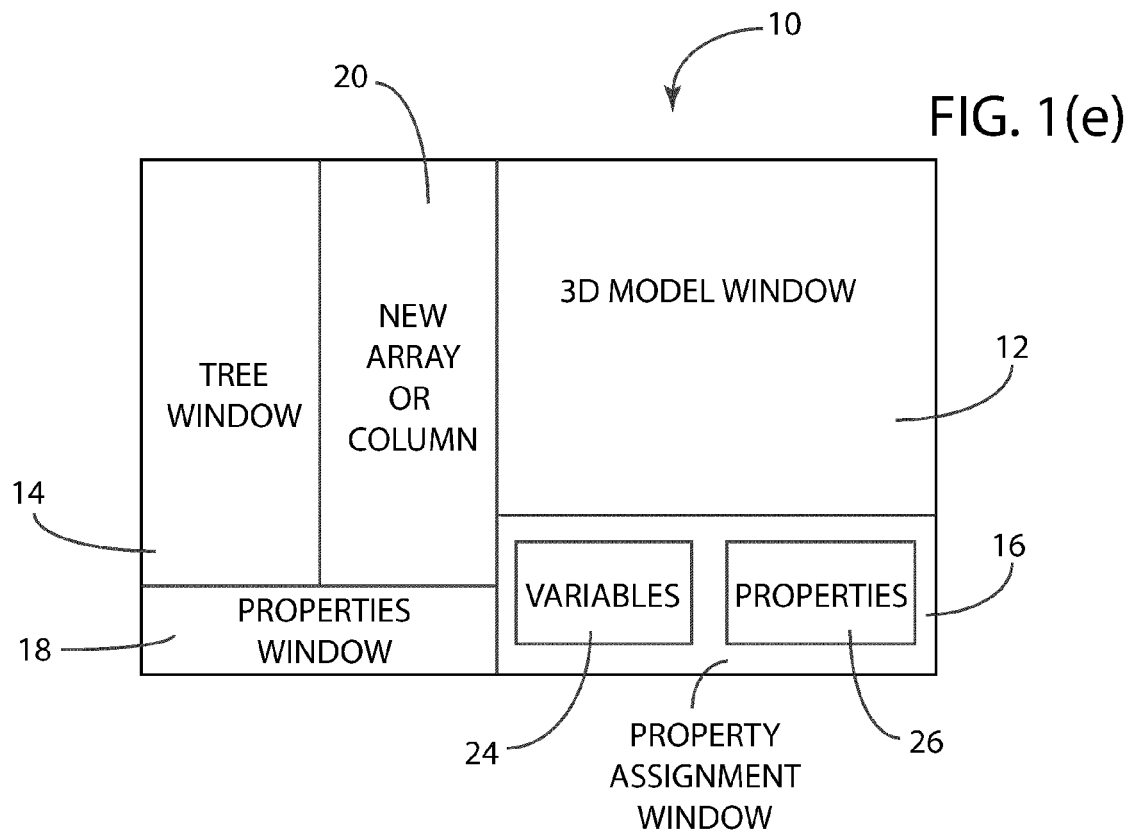

In the next step, as indicated in FIG. 1(e), a variable in the left hand side of property assignment window 16 is chosen from the list of variables 24 and linked to the chosen property selected from the list of properties 26 at the right hand side of property assignment window 16.

Figure 1F:
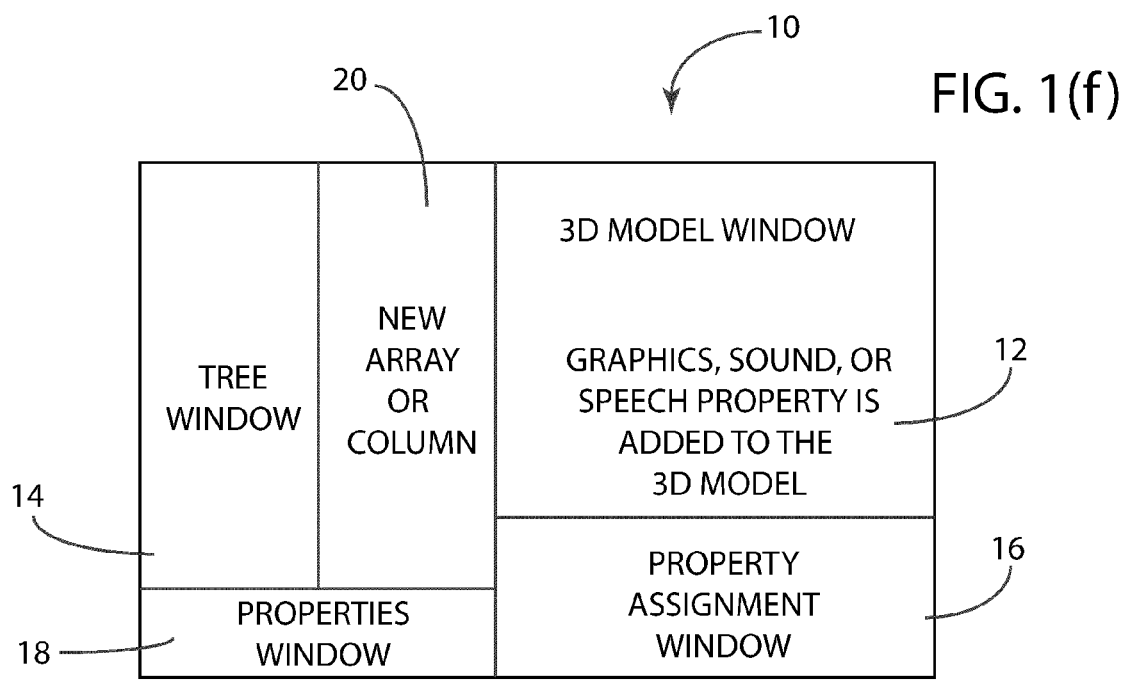

Next, the attributes are reflected in the 3D model using a selected interaction method. As indicated in FIG. 1(f), this reflection of the attributes in the 3D model can be achieved using, inter alia, graphics, sound or speech.

Figure 2:
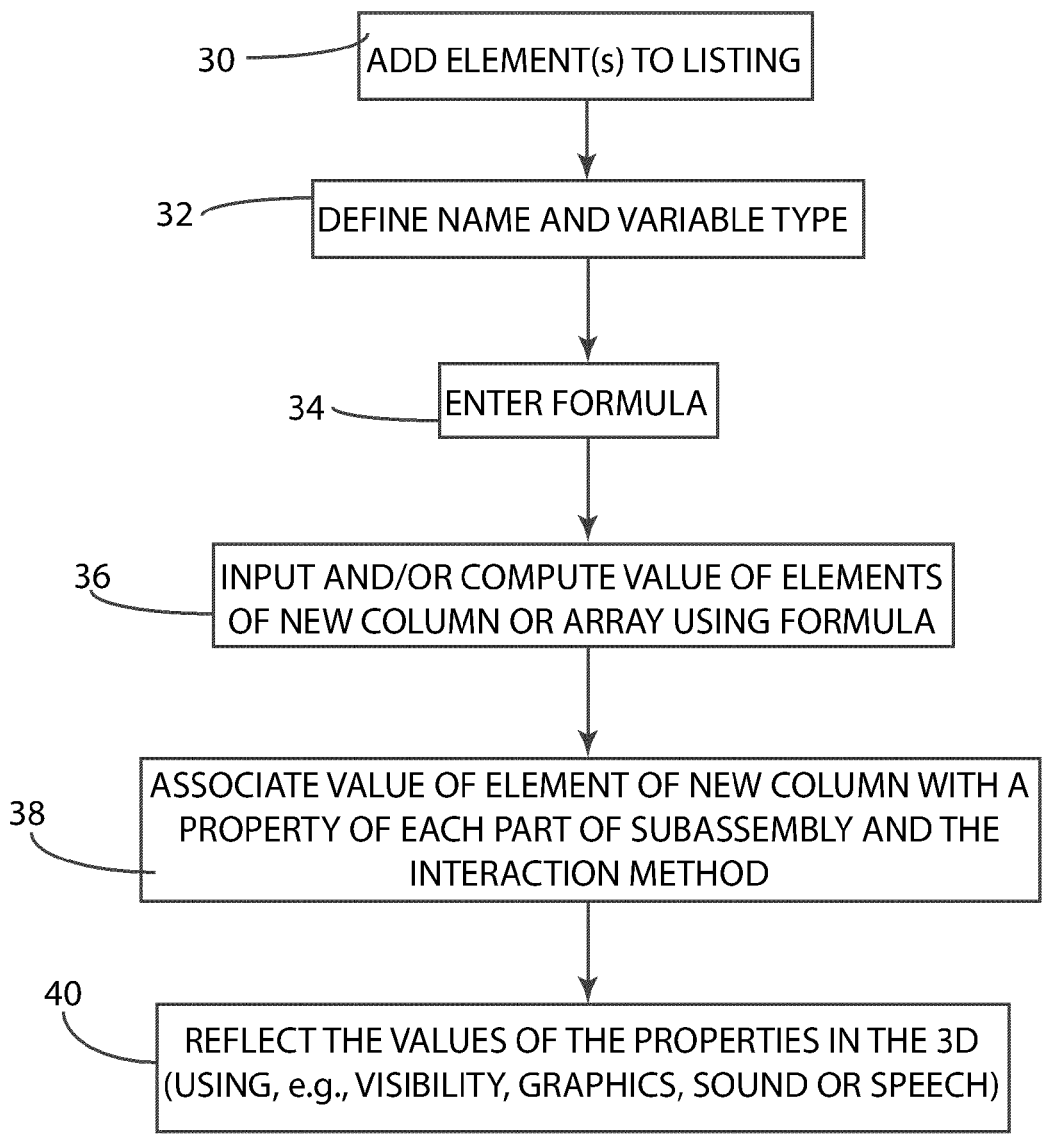
FIG. 2 is a flow diagram of one preferred embodiment of the method of the invention.

Referring to FIG. 2, there is provided a flow diagram of the preferred method of the invention which generally corresponds to that described above in connection with FIGS. 1(a) to 1(f). As indicated by block 30, in a first step an element or elements are added to the current listing, e.g., to tree of the tree window 14 of FIGS. 1(a) to 1(f). More specifically, in this step, an element or an array of elements is added to the tree structure that provides a listing of the assembly, subassemblies and parts. In a specific, non-limiting example, this step comprises adding two new columns to the tree structure, as indicated in the table below.

| Tree Structure | Date Completed | Nb of Days |
| --- | --- | --- |
| Assembly | Oct. 11, 2004 | 0 |
| Subassembly A | Oct. 10, 2004 | 1 |
| Part a | Oct. 2, 2004 | 9 |
| Part b | Aug. 4, 2003 | 422 |
| Part c | Feb. 24, 2004 | 241 |

In this table, the tree structure is indicated in the left hand column and includes (i) the Assembly, (ii) the Subassembly A of the Assembly and (iii) Parts a, b and c of the Subassembly A.

Referring again to FIG. 2, in the next step, depicted by block 32, a name and variable type are defined. In the example discussed above in connection with the table, the column "Date Completed" in the table is defined as a date and the number of days ("Nb of Days") is defined as integer.

In the next step, indicated by block 34, a formula, as defined above, is entered. In the example under consideration, the formula used is Nb of Days=Date completed (assembly)− Date completed (current selection).

The next step, indicated by block 36 in FIG. 2, involves inputting of the elements of the new array (column) of elements. The "Date Completed" (e.g., Oct. 11, 2004, Oct. 10, 2004, etc) can be entered by keyboard or transfer, etc., as described above. The number of days ("Nb of Days") is also computed and entered.

In the next step, shown by block 38, the value of the elements is associated with a property of each part of the subassembly and the interaction method.

Finally, as indicated by block 40, the values of the properties in the 3D model are reflected using one or more (and usually only one) technique.

Considering the steps represented by blocks 38 and 40 in more detail, and for example, considering the illustrative example depicted in the table, all of the objects in the 3D model may be a single color (e.g., red) and the intensity of the color (e.g., the intensity of the color red) may be made to depend on the number of calculated days so that, for example, if "Nb of Days" is between 0 and 255, the intensity of the red will reflect the number of days (so that, e.g., the intensity of "Part a" in the Table would be much less (or greater) than that of "Part c") whereas if "Nb of Days" is 256 or more, the intensity of the color would be that for 255 days. Moreover, with respect to the method, in a specific non-limiting example, the objects will be depicted as red with their corresponding intensity as soon as the cursor (or other control) is put in the "Nb of Days" column and is dragged (left button down) into the 3D model window.

The results of the foregoing can be used by the user or someone with whom the user works, e.g., someone in the management hierarchy, in reporting and/or in decision making. Moreover, the reporting can be audio reporting, i.e., the voice of John Smith saying that highlighted "Part c" of the 3D model presents a problem or problems in meeting the overall timetable for whatever reasons.

In another example, the 3D model is that of an airplane, including the mechanical and electrical parts thereof. Testing is done by applying a signal to one electrical wire and then measuring the signals at all other wire terminations. In the simple example under consideration, only electrical continuity will be checked. A malfunction is thus detected whenever there is a difference at one termination between: (i) the resistance value measured between the wire tested and the wire termination, and (ii) the expected value of the resistance between the wire tested and the termination, and, in addition, whenever this difference between the measured and expected values is greater than a predetermined value (number).

In this example, the method of the invention is used to create an array with three columns, viz., (i) one for expected values, (ii) a second for measured values and (iii) a third for the value of the difference between the first and second columns. If the value of the third column is greater than a predetermined value, i.e., a value indicating an open circuit or other malfunction (for example, a value greater than 10,000 (10 k) ohms), this is reflected in the 3D model. For example, when difference value exceeds the predetermined reference value, the corresponding wire is colored red in the 3D model and if not, the wire is made transparent.

This representation of the testing results enables a determination to be made as to the path of a wire that is indicated to have problems, to identify connections along this panel and to also identify the hatches and panels that will need to be opened to change the problem wires and their connectors.

In yet another example, the 3D model is used to represent a warehouse and its contents. In this example, all incoming goods have an identifier (e.g., a RFID identifier). A mobile reading device located in the warehouse enables detection of the identifier and also simultaneously provides its location, i.e., the location of the reading device.

In this example, this information is entered into the system of the present invention when the information is captured, and the 3D model is updated to reflect all new goods, i.e., all incoming goods having a new identifier. Further, on a daily basis, the reader acquires information such as the date, the time and location of the goods in the warehouse.

Also in this example, the method of the invention can be used, for example, to indicate which goods in the warehouse are not moving, and how long the goods have not been moving, by, e.g., highlighting the goods in the 3D model in different ways or controlling the visibility thereof. This approach can also be used to show, e.g., which goods are moving, the path of movement of the goods and the number of times that the goods have been moved (e.g., whether the goods have been moved more than once). It will be appreciated that such visualization of the movement of the goods (or lack thereof) enables the warehouse management to immediately improve the productivity of the warehouse.

Considering another very simple example of how the system would be implemented, information about parts such as part name, part price, part weight, part volume are initially stored in a file in the system. Information about the date is provided by the system. All of this information is reflected in the tree window. Similarly, the system can, for example, define, for each part, its color, its opacity, and/or whether the part is visible or not. These values are reflected in the 3D model window. If, for example, the user is interested in a new variable, part density, the user then creates a new column "part density," wherein the value for "part density" is determined based on the part weight and part volume (i.e., part density is the weight of the part divided by its volume). The 3D model will now be modified, for example by having the opacity of the part directly tied to the density of the part, with, for example, a high density part being almost opaque and a light part being almost translucent. This assignment of the user variable "part density" to part opacity is now active in both directions. In this regard, a change in the value of the density of a given part is immediately reflected on the 3D model. Similarly, the user can click on the image of a part in the 3D model and find the value of the density for that part in the new column "part density."

As indicated above, the present invention is more than a juxtaposition of a viewer and a spreadsheet. In this regard, it will be appreciated that if a viewer and a spreadsheet were simply to be used in juxtaposition with one another, a number of requirements would have to be met. These include: (i) the contents of the fixed arrays of the viewer would have to be transferred to the viewer; (ii) the variable or variables that are going to be used would have to be defined, probably on the spreadsheet; (iii) the values of new elements would have to be computed using, e.g., the formulas of the spreadsheet; (iv) at least one new array of elements would have to be created in the viewer (something that may not be possible); (v) the results of applying the spreadsheet formulas would have to be transferred into the arrays of the viewer; (vi) the methods which would be used to associate the properties with the 3D model would have to be defined; and the properties or the parts and subassemblies in the 3D model would have to be updated, something that would not take place in real time.

It should be apparent from the foregoing that the invention enables a number of operations to be carried out. These operations include an "analyze" operation. For example, objects can be sorted by rank on an attribute (e.g., a date planned for production), and a display provided of the first 10, 20, 50, 100, or all according to a color code. Further, the user can create a query on some attributes by using order relationship and Boolean logic (e.g., find parts that cost more than $10.00 AND are being outsourced), and display the parts by decreasing value with a color code. Moreover, instead of, or in addition to, a color code, the part can be associated with a sound or a synthesized sentence, in response to clicking on, or otherwise selecting, the part. It is noted that the quality of the analysis is improved when the software recognizes many data types (dimensions, weight, dates, dollar amount, string, and the like).

The invention can also be used in "reason" operations. For example, as discussed above, the user can create user-defined columns which are added to the tree structure window, as needed. Each field can accept either a value entered by a keyboard or other means, or a value which is the result of a computation defined by the user as a formula entered in the formula bar (e.g., dividing the dollar amount by weight will give the value per weight).

The results of such operations can be used to propose or make a decision and, in particular, to annotate and comment on the decision or proposed action (e.g., by providing markup, or a label).

As indicated above, the invention can also be used to report or share the outcome or result. For example, the user can send the proposal together with the user-defined fields, formulas and results supporting the decision, to the management hierarchy, for collaboration, or to inform others.

Thus, the invention enables the user to sort objects, to create different data types, to create user-defined fields as needed, to have the field accept values entered by a keyboard or other means, or as the result of a computation defined by the user based on a formula, to annotate and comment on the decision or proposed action, and to export the results including the newly created data to others.

Although the invention has been described above in relation to preferred embodiments thereof, it will be understood by those skilled in the art that variations and modifications can be effected in these preferred embodiments without departing from the scope and spirit of the invention.

What is claimed:

1. A viewer system comprising:
   a computer including a display screen and a user input; and
   a computer readable medium having computer executable instructions stored thereon for execution by the computer, the instructions comprising the steps of:
   providing a display on said display screen of both a three dimensional (3D) model and a spreadsheet including elements relating to the 3D model;
   augmenting by adding at least one column or array to the spreadsheet in response to an entry at the user input so as to produce an augmented spreadsheet linked to the 3D model, so that at least one element of the augmented spreadsheet has an additional value; and
   automatically reflecting in the 3D model the additional value of the at least one element of the augmented spreadsheet, without the creation of any new geometric entities or the reflection of any spatial manipulation or motion of the 3D model, and without reflecting any design changes of the 3D model, in response to the augmenting of the spreadsheet.

2. A viewer system as claimed in claim 1 wherein the reflecting step comprises associating, in real time, a part of the 3D model with an immediate attribute selected from the group consisting of, visibility, color shade, sound and speech.

3. A viewer system as claimed in claim 1 wherein the spreadsheet includes a tree structure which comprises at least one assembly, a plurality of subassemblies forming said at least one assembly and a plurality of parts for each of said plurality of subassemblies, and the step of augmenting the spreadsheet includes adding at least one column or array to the tree structure.

4. A viewer system as claimed in claim 3 wherein the augmenting step further comprises defining a name and variable type for the at least one column added to the tree structure.

5. A viewer system as claimed in claim 4 wherein the augmenting step further comprises using a formula to compute values for the elements of the at least one added column.

6. A viewer system as claimed in claim 5 wherein the augmenting step further comprises providing for inputting of the values of the elements of the at least one added column.

7. A viewer system as claimed in claim 5 wherein the augmenting step includes associating the value of the elements of the at least one column with each part of the at least one subassembly and selecting an interaction method for providing interaction between value of the elements and the parts of the at least one subassembly.

8. A method for visualizing a three dimensional (3D) model, said method comprising the steps of:
   providing a display of both a three dimensional (3D) model and a spreadsheet including elements relating to the 3D model;
   augmenting the spreadsheet by adding at least one column or array to the spreadsheet in response to external input so as to produce an augmented spreadsheet linked to the 3D model, so that at least one element of the augmented spreadsheet has an additional value; and
   reflecting in the 3D model the additional value of the at least one element of the augmented spreadsheet, without the creation of any new geometric entities or the reflection of any spatial manipulation or motion of the 3D model, and without reflecting any design changes of the 3D model, in response to the augmenting of the spreadsheet.

9. A method as claimed in claim 8 wherein the reflecting step comprises associating, in real time, a part of the 3D model with an immediate attribute selected from the group consisting of visibility, color shade, sound and speech.

10. A method as claimed in claim 8 wherein the spreadsheet includes a tree structure which comprises at least one assembly, a plurality of subassemblies forming said at least one assembly and a plurality of parts for each of said plurality of subassemblies, and the step of augmenting the spreadsheet further includes defining a name and variable type for the at least one column added to the tree structure.

11. A method as claimed in claim 10 wherein the augmenting step further comprises using a formula to compute values for the elements of the at least one added column or inputting the values of the elements of the at least one added column, associating the value of the elements of the at least one column with each part of the at least one subassembly and selecting an interaction method for providing interaction between values of the elements and the parts of the at least one subassembly.

12. A viewer system comprising:
   a computer including a display screen and a user input; and
   a computer readable medium having computer executable instructions stored thereon for causing the computer to:
      display on the display screen a 3D model window and a tree window, the 3D model window showing a display of a static 3D model of an object, and the tree window displaying a tree structure of the object, the tree structure comprising a plurality of parts of the object;
      augment the tree structure of the object by the addition of a new column of elements corresponding to the plurality of parts of the object; and
      update the display of the static 3D model of the object to reflect values of each element of the new column of elements corresponding to each part of the plurality of parts of the object, without the creation of any new geometric entities or the reflection of any spatial manipulation or motion of the 3D model, and without reflecting any design changes of the 3D model, in response to:
         receiving a value of each element of the new column of elements;
         receiving, from a user via a properties assignment window and the user input, an association of the new column of elements with a display property of the plurality of parts of the object.

13. The viewer system of claim 12, wherein receiving a value of each element of the new column of elements comprises computing the value of each element of the new column of elements by applying a formula to the tree structure of the object.

\* \* \* \* \*